United States Patent
Casals et al.

(10) Patent No.: US 8,406,590 B2
(45) Date of Patent: Mar. 26, 2013

(54) APPARATUS FOR MANUFACTURING AN OPTICAL CABLE AND CABLE SO MANUFACTURED

(75) Inventors: Luis Sales Casals, Vilanova I la Geltru (ES); Flavio Sangalli, Milan (IT); Francesco Della Corte, Milan (IT); Alessandro Ginocchio, Milan (IT)

(73) Assignee: Prysmian Cavi e Sistemi Energia S.r.l., Milan (IT)

( * ) Notice: Subject to any disclaimer, the term of this patent is extended or adjusted under 35 U.S.C. 154(b) by 0 days.

(21) Appl. No.: 13/412,807

(22) Filed: Mar. 6, 2012

(65) Prior Publication Data

US 2012/0189255 A1 Jul. 26, 2012

Related U.S. Application Data

(62) Division of application No. 11/909,203, filed on Oct. 6, 2009, now Pat. No. 8,150,226.

(51) Int. Cl.
| | |
|---|---|
| B21D 3/00 | (2006.01) |
| B21D 15/00 | (2006.01) |
| B21D 3/02 | (2006.01) |
| B23K 31/02 | (2006.01) |
| E21B 19/16 | (2006.01) |
| G02B 6/44 | (2006.01) |
| H04B 9/00 | (2006.01) |

(52) U.S. Cl. ......... 385/100; 72/106; 228/102; 166/380; 385/109

(58) Field of Classification Search .......... 385/100–109, 385/141, 147; 72/176; 228/102, 146–148, 228/219, 199; 166/380
See application file for complete search history.

(56) References Cited

U.S. PATENT DOCUMENTS

| | | | |
|---|---|---|---|
| 3,765,216 A | 10/1973 | Green | |
| 4,146,302 A | 3/1979 | Jachimowicz et al. | |
| 4,852,790 A | 8/1989 | Karlinski | |
| 5,143,274 A * | 9/1992 | Laupretre et al. | 228/102 |
| 5,318,215 A * | 6/1994 | Toya et al. | 228/148 |
| 5,999,250 A | 12/1999 | Hairston et al. | |
| 6,047,586 A | 4/2000 | Hannen | |
| 6,253,587 B1 * | 7/2001 | Nolden et al. | 72/7.4 |
| 6,301,414 B1 | 10/2001 | Liese et al. | |
| 6,522,815 B1 * | 2/2003 | Staschewski | 385/109 |
| 2004/0008956 A1 | 1/2004 | Frohne et al. | |
| 2004/0045705 A1 | 3/2004 | Gardner et al. | |
| 2004/0213529 A1 | 10/2004 | Dowd et al. | |
| 2005/0211326 A1 | 9/2005 | Hibino et al. | |
| 2005/0236161 A1 | 10/2005 | Gay et al. | |

FOREIGN PATENT DOCUMENTS

| | | |
|---|---|---|
| JP | 05019153 | 1/1993 |
| JP | 1183763 | 9/1999 |

* cited by examiner

*Primary Examiner* — Akm Enayet Ullah
(74) *Attorney, Agent, or Firm* — Norris McLaughlin & Marcus, P.A.

(57) ABSTRACT

A method and apparatus for manufacturing an optical cable comprising at least one metal tube housing at least one optical fiber and having a predetermined excess fiber length (EFL) is described. In this method the metal tube is plastically deformed and shortened by a predetermined amount ($S_t$) greater than the predetermined EFL and is plastically deformed after shortening to provide a controlled elongation thereof so as to reach the predetermined excess fiber length. An optical cable so manufactured has a local excess fiber length (EFL) varying of or less than 0.2% along the longitudinal extension of the cable with respect to an average EFL of the cable.

48 Claims, 5 Drawing Sheets

APPARATUS FOR MANUFACTURING AN OPTICAL CABLE AND CABLE SO MANUFACTURED

CROSS REFERENCE TO RELATED APPLICATION

The present application is a divisional of U.S. patent application Ser. No. 11/909,203 filed Oct. 6, 2009 now U.S. Pat. No. 8,150,226.

BACKGROUND OF THE INVENTION

The present invention relates to a method for manufacturing an optical cable, to an apparatus for said manufacturing and to an optical cable comprising at least one metal tube housing at least one optical fiber.

The protection of optical fibers by housing in a metal tube finds application in aerial, underground and underwater cable.

Typically, the metal tube encloses a single fiber or several optical fibers, preferably gathered in a multi-fiber bundle. Metals, such as steel, aluminium, aluminium alloys or copper, can be used to manufacture the tube.

PRIOR ART

One method for providing a metal tube around one or more optical fibers comprises the step of shaping a metal tube with a longitudinal slit, said slit being sealed after the positioning of the optical fibers in the tube. See, for, example, U.S. Pat. No. 6,522,815 (in the name of Nexans Deutschland Industries AG & Co. KG).

U.S. Pat. No. 6,047,586 (in the name of Alcatel) relates to a process wherein a metal tube is manufactured by extruding a starting material through a forming nozzle. During the time the metal is extruded, optical fibers are conveyed to the center of the forming nozzle through a second opening. The technique is the Conform™ process for manufacturing profiles and tubes from non-ferrous metals (as described, for example, in U.S. Pat. No. 3,765,216). With this technique, metal in form of a strand is introduced into a groove disposed about the circumference of a rotating frictional wheel. The wheel conveys the metal to a retaining space of a retaining block that engages in the groove and seals the groove. The rotation of the frictional wheel produces high temperatures and high pressures in the retaining space, which plastically deform the metal. The metal can then be extruded through a forming nozzle and solidify to form a profile or a tube.

In the above cited kind of cables, the optical fiber is usually provided to have a length higher than that of the metal tube, in particular, in order to take into account the different thermal coefficients of the glass of the fibers and of the metal of the tube.

Said excess fiber length (EFL) usually varies as a function of the cable construction, of the materials employed and of the metal tube diameter. A suitable EFL protects the optical fibers from attenuation increases and mechanical failures due to stresses generated on the cable during its life, such as during the installation or caused by environmental conditions, e.g. temperature changes, wind, ice, during operation.

U.S. Pat. No. 6,047,586 discloses to produce an excess length inside the metal tube by moving with a slightly higher feed velocity the fibers through the channel terminating in the forming nozzle.

The Applicant observed that this method is difficult to be carried out, and the results in term of excess fiber length are unreliable.

U.S. Pat. No. 6,522,815 shows that to produce the excess length of the optical fibers compared to the metal tube, a corrugation device is arranged downstream from a capstan which presses a corrugation into the wall of the tube in a continuous operation. The excess length of the optical fiber is a function of depth and pitch of the corrugation.

According to US 2004/0008956, in order for the optical fiber in the metal tube to be provided with an excess length, the metal tube is gripped continuously between a clamping jaw draw-off whose clamping jaw pairs grip the metal tube securely and apply deforming forces. The metal tube undergoes elastic deformation, i.e., it is stretched. Therefore, equal lengths of stretched metal tube and optical fiber are wound onto a draw-off disk. The state of elastic deformation "relaxes" on the draw-off disk and the metal tube is shortened to the normal condition.

SUMMARY OF THE INVENTION

Within the present invention, the Applicant perceived that advantages could arise from using the plastic deformation portion of the load/elongation diagram of the metal tube rather than the elastically deformation portion of the load/elongation diagram of the metal tube.

However, the Applicant experienced that providing an excess fiber length by corrugating a tube, the resulting cable has an EFL varying beyond acceptable limits along the longitudinal extension of the cable.

In particular, within the present invention the Applicant has observed that, while the shortening of a tube, in particular the shortening of a metal tube by plastic deformation, is an operation difficult to be carried out to produce a constant result the plastic elongation of the tube is a reproducible process which can be controlled with precision in industrial production.

The Applicant found that an optical cable with an EFL substantially constant along the longitudinal extension thereof can be produced by imparting an EFL higher than the desired one during at least one step of the manufacturing process and subsequently plastically stretching the tube housing the fibers in a controlled manner to the final EFL value.

In a first aspect, the present invention relates to a method for manufacturing an optical cable comprising at least one metal tube housing at least one optical fiber, said cable having a predetermined excess fiber length (EFL), said method comprising the steps of:

advancing said optical fiber;
measuring a length of said optical fiber advanced in a time span;
forming a metal tube around said optical fiber;
obtaining the congruence between the metal tube and said optical fiber;
plastically deforming the metal tube shortening the metal tube by a predetermined amount ($S_t$) greater than said predetermined EEL, while advancing the metal tube;
plastically deforming the metal tube after shortening to provide an elongation thereof, while advancing the metal tube;
measuring a length of the metal tube advanced in said time span after said elongation;
evaluating a resulting excess fiber length as a function of said measured optical fiber length and of said measured metal tube length;

adjusting the resulting excess fiber length by controlling the elongation of the metal tube to reach said predetermined excess fiber length.

To the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

In the present description and claims, as excess fiber length (EFL) it is meant the value given by the following formula $$EFL(\%) = \frac{L_f - L_t}{L_t} \cdot 100 \qquad (1)$$

wherein
$L_f$ is the length of the at least one optical fiber and
$L_t$ is the length of the metal tube housing the fiber/s.

The EFL obtained by the method of the invention can preferably range from −1.5% to 1.5% depending on the requirement of the specific optical cable to be manufactured. Typically, a positive EFL is advantageous in all of the cases when the cable can be subjected to tensile loads or elongations, for example, in aerial optical cables; however, in some cases a negative EFL may be advantageous, for example, in underground cable, especially when buried in grounds subjected to freeze.

In view of the above definition, the excess fiber length (EFL) can be easily measured in the finished cable.

In order to measure the EFL for control purpose during the cable manufacturing process, the EFL is determined as a function of the measured advanced length of the optical fibers in a given period of time and of the measured advanced length of the metal tube in the same period of time. If such value is calculated on the basis of the measured advanced length of the metal tube at the end of the manufacturing line (i.e. when the tube is not expected to undergo any further dimensional change, the obtained value corresponds too the final cable EFL, being the fiber substantially inextensible along the whole cable manufacturing fine.

In the present description and claims, as "time span" it is meant an arbitrary period of time. Preferably, a useful time span in the cable manufacturing according to the present invention is of the order of magnitude of the time taken by an optical fiber, for traveling along the manufacturing line at the usual manufacturing speed to go along the whole length of the manufacturing line (typically ranging from 10 to 50 m).

Different time span can be used in view of specific manufacturing needs, for example, a shorter time span can be useful for achieving a particularly high constancy of the EFL value along the cable, where the specific cable application so requires; or at high manufacturing speed, while a longer time span can enable the use of simpler measurement devices and control apparatus, or be used at low manufacturing speed.

The step of forming the metal tube around the optical fiber can be made by a technique known in the art, for example by providing a metal tube with a longitudinal slit that is sealed after insertion of the at least one optical fiber, or by forming the metal tube in situ by extruding a plasticized metal, the latter manner being preferred.

Advantageously, the step of forming the metal tube around the at least one optical fiber includes monitoring the speed of the formed metal tube. Advantageously, the method of the invention further comprises a step of supplying a filler material into said metal tube.

Preferably, the filler material is advanced separately from the optical fiber until after the metal tube is formed around the optical fiber In a preferred embodiment, the method of the invention further comprises the steps of
  feeding a plasticized metal through a nozzle to form a metal tube;
  conveying at least one optical fiber into the metal tube through a first feed channel with an end disposed downstream from the nozzle; and
  conveying a filler material into the metal tube through a second feed channel having an end disposed downstream from the nozzle.

In the present description and claims, as "obtaining the congruence" it is meant causing the optical fiber and the metal tube to be lengthwise linked together.

If the congruence is obtained by winding the metal tube containing the optical fiber on a pulley or the like, the length of the optical fiber may result to be smaller than that of the metal tube, because the fiber is wound on a diameter which is smaller than the winding diameter of the tube axis. In such case, in order to reach the final EFL, the shortening of the metal tube must take into account also this fiber length reduction.

Preferably, because in such case the fiber is subject to tensile stress after its winding inside the tube on the congruence pulley, the subsequent tube shortening should be made immediately afterwards the fiber and tube leave the congruence pulley, in order to reduce the time in which the fiber is exposed to such tensile stress.

In the present description and claims, as "plastically deforming" it is meant to cause a change in the metal tube length by applying a force, said change lasting after the applied force is removed. For example, said change can result from the application of sustained stress beyond the elastic limit of the tube material.

Preferably, the shortening step is carried out by corrugating, creasing or indenting said at least one metal tube. In the present description and claims, the term "indenting" shall encompass also the term "creasing" and "corrugating" unless otherwise specified.

For example, the shortening is obtained by indenting the metal tube with a helical deformation having predetermined values of pitch and depth. Preferably, a pitch of from 5 to 15 mm is set.

Preferably, the shortening amount $S_t$ is from 0.2% to 0.4% greater than the one corresponding to the predetermined EFL.

The step of evaluating the resulting EFL is carried out by comparing the metal tube length after elongation with the length of the optical fiber as measured upstream from the congruence.

Preferably, the step of adjusting the resulting EFL by controlling the elongation of the metal tube is effected by a speed adjustment on the apparatus drawing the tube. More particularly, the elongation of the tube is effected by increasing the drawing speed of the tube when the resulting EFL is higher then the predetermined one, or by reducing the drawing speed of the tube when the resulting EFL is lower than the predetermined one.

In another aspect, the present invention relates to an optical cable comprising at least one metal tube and at least one optical fiber housed therein, said cable having a local excess fiber length (EFL) varying of or less than 0.2% along the longitudinal extension of the cable with respect to an average EFL of the cable.

In the present description and claims, as "average EFL" is meant an EFL value resulting from optical fiber and tube lengths measurements taken on an optical cable at least 1 km long.

In the present description and claims, as "local EFL" it is meant an EFL value resulting from fiber and tube lengths measurements taken on a cable portion having a length of 10 m to 50 m.

Preferably, in a cable according to the present invention, the local EFL measured in cable portions distant at least 100 m from each others in a cable length of at least 1 km, varies of or less than 0.2% along the longitudinal extension of the cable with respect to the average EFL of said cable length.

Examples of optical cables according to the invention are cables for aerial use such as optical ground wire (OPGW) and optical phase conductors (OPPC); and terrestrial cables for use in harsh environment, or, in general, when a metal protection is desirable.

In an embodiment, preferred according to the invention, the cable of the invention has an average EFL of from 0.2% to 1.5%, more preferably of from 0.2% to 0.9%. In another embodiment, the average EFL can have negative values, for example of −0.5%.

Preferably, the local EFL differs from the average EFL of or less than 0.1%.

Preferably, the optical cable of the invention comprises at least one metal tube housing from 12 to 96, more preferably from 24 to 48 optical fibers.

The metal tube is made from a plastically deformable metal material. Examples of such metal materials are steel, aluminium, aluminium alloys and copper.

In a preferred embodiment of the invention, the metal tube is longitudinally shortened with respect to the at least one optical fiber housed therein. More particularly, the metal tube is longitudinally shortened by creasing, indentation or corrugation. More preferably the metal tube is indented.

In a preferred embodiment, the creasing, indentation or corrugation of the metal tube has a depth of from 0.05 mm to 2 mm, more preferably from 0.1 mm to 1 mm from the outer enveloping surface of the tube.

In a preferred embodiment, said creasing, indentation or corrugation is an helix with a pitch of from 5 mm to 15 mm.

Preferably, the metal tube has an internal diameter of from 2 to 11 mm, more preferably from 2 mm to 4 mm.

Preferably, the metal tube has an external diameter of from 3 to 15 mm, more preferably from 3 mm to 6 mm.

To the purpose of the present description and claims, the internal and external diameters of the tube are referred to the internal and external cylindrical surfaces of the tube and do not take into account the creasing, indentation or corrugation of the same.

In a preferred embodiment, the optical fiber housed in the metal tube is embedded in a filler material. Examples of a filler material is a gel, a jelly or a grease. Preferably, said filler material has at least one characteristic selected from hydrophobicity, hydrogen absorption, thixotropy. More preferably said filler material is hydrophobic and thixotropic. More preferably is a filler material is hydrophobic, thixotropic and capable of absorbing hydrogen.

Preferably, a filler material suitable for the invention has a hydrogen absorption equal to or higher than 0.1 cm$^3$ STP/g, more preferably equal to or higher than 0.5 cm$^3$ STP/g.

Preferably, a filler material suitable for the invention has a room temperature viscosity of from 40 to 300 Pa·s (shear rate of 1.56/s), more preferably from 50 to 120 Pa·s. The viscosity values are from a rheological measurement by means of a stress control rheometer Bohlin CVO 120 with a cone-and-plate 2°/40 mm measuring system at constant temperature.

In another further aspect, the present invention relates to an apparatus for manufacturing an optical cable comprising at least one metal tube housing at least one optical fiber, said cable having a predetermined excess fiber length (EFL), the apparatus comprising
 a device for continuously forming a metal tube;
  a first feed channel for conveying at least one optical fiber into said metal tube;
  a first pulling device for making the metal tube and the at least one optical fiber congruent;
  a corrugator for shortening said metal tube;
  a second pulling device for elongating said metal tube.

An example of device for forming the metal tube according to the invention is a continuous metal extruder machine.

Advantageously, said apparatus comprises a second feed channel for conveying a filler material into said metal tube.

Advantageously, the second feed channel is coaxial and in a radially external position with respect to the first feed channel.

The apparatus of the invention advantageously comprises a first cooling device surrounding said first feed channel.

Preferably, said first cooling device comprises a cooling tube, coaxial and in a radially external position with respect to the first feed channel, said cooling tube housing a flowing a cooling fluid.

More preferably, said cooling tube is coaxial and radially external to the second feed channel.

A second cooling device, for example a cooling trough operating by water spraying, is preferably provided downstream from the device for forming the metal tube.

Optionally, upstream from the first pulling device, a die can be provided for equalizing the dimension or the surface of the metal tube. Said die can also provide a reduction of the metal tube diameter.

The first pulling device is, for example, a capstan or a caterpillar, the first being preferred.

Within the present description and claims, by capstan we mean a motor driven pulley around which the cable or tube is wound by at least one turn. If needed, such capstan includes a caterpillar acting on the cable or tube immediately downstream the drum or pulley to pull the cable or tube with a force high enough to generate a friction preventing slippage of the cable or tube on the surface of the drum or pulley.

Within the present description and claims, by caterpillar it is meant two motor driven endless metal belts carried by relevant pulleys, between which the cable or tube is clamped. When a caterpillar is used as pulling device, the clamping force of the belts is high enough to allow to transmit by a drawing force to the cable without cable slippage.

In the present description and claims as "corrugator" it is meant a device capable of shortening the metal tube by plastic deformation, e.g. by indenting, corrugating or creasing the wall of the metal tube.

The second pulling device can be selected from a caterpillar or a capstan, the latter being preferred.

Advantageously, the apparatus of the invention further comprises at least one length measuring device for checking the course of the manufacturing process. Preferably, length measuring devices are provided, for example, upstream from the first feed channel, upstream and downstream from the first pulling device, downstream from the second pulling device. Advantageously, said length measuring devices measure the length of the optical fibers, of the metal tube or both while advancing along the apparatus. Each of said length measuring devices is advantageously connected to a counter.

Examples of length measuring devices used in the present manufacturing apparatus are encoders and laser-based contactless measuring instruments using the Doppler effect.

Preferably, at least one of said length measuring device is an encoder.

BRIEF DESCRIPTION OF THE DRAWINGS

The invention will be further illustrated with reference to the following examples and figures, wherein.

DETAILED DESCRIPTION OF THE PREFERRED EMBODIMENTS

Figure 1:
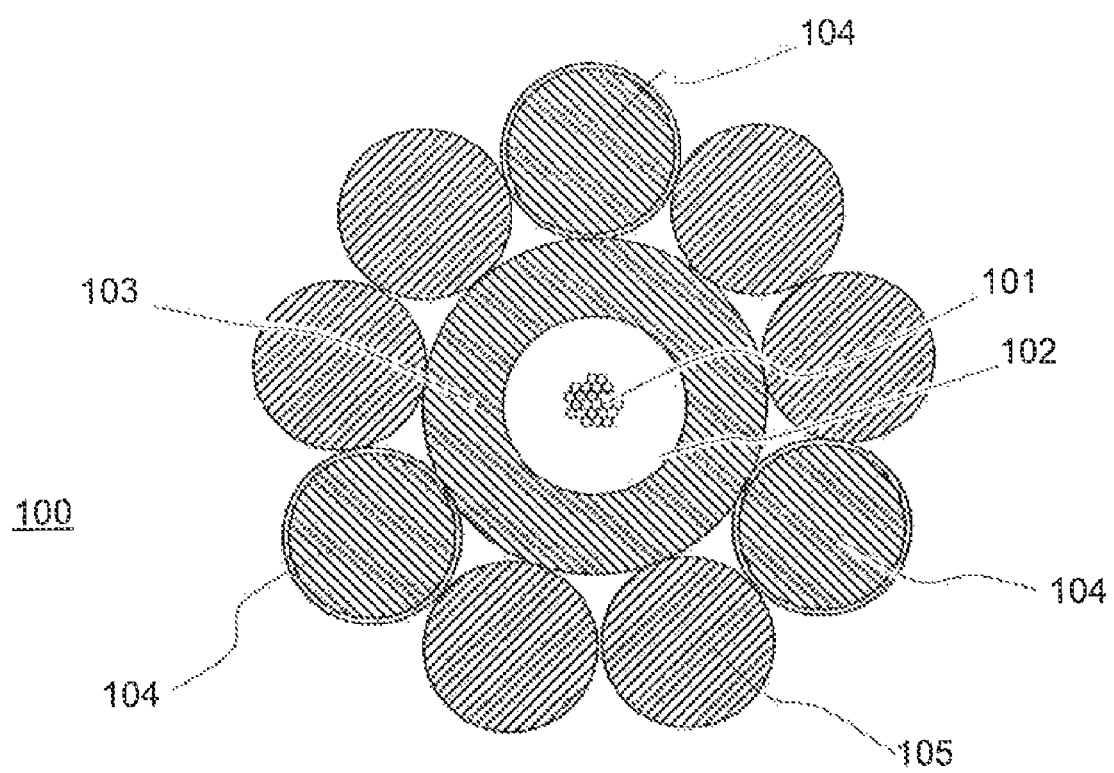
FIG. 1 shows a cross-sectional view of an optical cable according to the invention.

In FIG. 1 an example of an OPGW cable 100 according to the invention is shown.

The cable 100 comprises a bundle of optical fibers 101 embedded in a filler material 102, the whole being housed in an aluminium tube 103. Armoring elements 104, 105 are provided in a radially external position with respect to the aluminium tube 103.

Preferably, the armoring elements are helically wound around the tube 103 in a single layer, coaxial to the tube 103.

In a preferred embodiment, in particular for use as OPGW (Optical Ground Wire), the armoring elements include aluminium-clad steel wires 104, and aluminium wires 105. The number and diameter of the aluminium-clad steel wires 104 and of the aluminium wires 105 is determined on a case by case basis in view of the needed tensile strength of the cable and of the needed electrical resistance of the cable (in particular for its use as ground wire in high voltage electrical aerial lines)

For cables for different uses the armoring elements may not be present or be made with different materials, either metallic or dielectric.

Depending on the use, one or more sheaths or polymeric material may be present outside the aluminum tube 103 (not shown).

Figure 2:
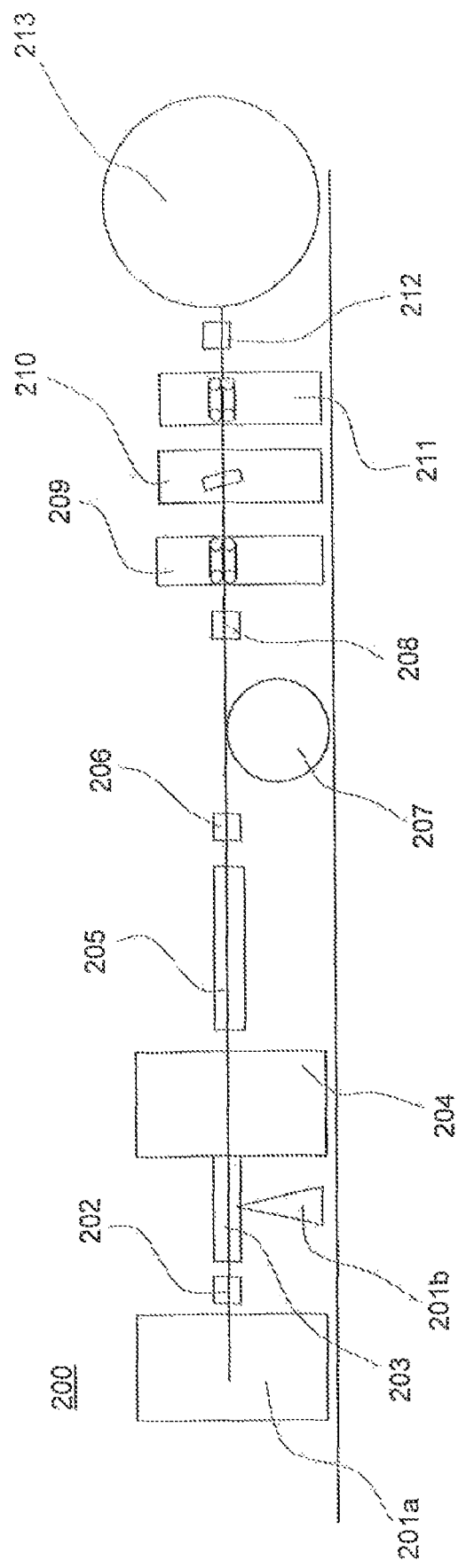
FIG. 2 is a schematic side view of an apparatus according to the invention.

In FIG. 2 an apparatus for manufacturing a cable according to the invention is illustrated.

In the apparatus 200 of FIG. 2, a pay-off stand 201a and a feeding system 201b are provided for supplying, respectively, the optical fibers and the filler material.

Typically, the fibers pay-off stand 201a comprises one or more fiber carrying drums from which the fibers are unwound, with controlled friction, and conveyed to form a fiber bundle to be fed to the subsequent apparatus elements.

At the output of the fibers pay-off stand 201a a first encoder 202 is provided, suitable to measure the length of the optical fibers advanced in a given period of time.

The encoder is a commercial apparatus and generally includes a roller, friction driven in rotation by the moving fibers, without slippage. The rotation of the roller is monitored and an electronic circuit is provided to calculate the advanced length as a function of the detected roller turns.

After the first encoder 202 the optical fibers are conveyed into an injection system 203.

The injector system 203 is operatively connected to a metal extruder machine 204, where the metal tube is extruded. An example of the metal extruder machine 204 is a Conform™ machine.

At the output of the metal extruder machine 204 a cooling trough 205 is provided, that cools down the extruded metal tube by means of a cooling fluid, preferably by water spraying.

A second encoder 206 is provided for monitoring the advancement of the metal tube housing the optical fibers at the output of the cooling trough 205.

After the second encoder 206 a capstan 207 is provided, around whose drum the tube housing the fiber or fibers is wound with one turn.

The winding of the tube around the drum of the capstan 207 achieves the congruence between optical fibers and metal tube.

The winding of the tube and the fibers around the drum of the capstan 207 causes the length of the optical fibers in the tube to be lower than that of the metal tube, as already explained above.

The amount of subsequent metal tube shortening is selected in order to take into account also this fact.

From the capstan 207 the metal tube is pulled by a first caterpillar 209 and led to the entrance of a corrugator 210.

Between the capstan 207 and the first caterpillar 209, a third encoder 208 is provided for measuring the tube length. Alternatively, said encoder 208 can be positioned on the capstan 207 itself.

The first caterpillar 209 is preferably positioned near to the corrugator 210.

The corrugator 210 is a machine capable of causing a plastic deformation of the tube, in the form of a corrugation, indentation or creasing. Preferably, such corrugation or indentation is obtained by an indentation head including an offset ring through which the tube is drawn, caused to rotate around the tube and interfering with its outer diameter for a part of its rotation.

The action of the ring on the tube causes the tube itself to be plastically deformed according to an indented helix, whose pitch, width and depth are determined by the geometrical parameters of the corrugator and by the advancing speed of the tube. Such pitch, width and depth are parameters which, in combination, determine the corresponding amount of shortening of the tube.

Such shortening parameters are set on the corrugator 210 and may be varied during the operation. In particular, the indentation head varies his rotation speed following variations of the tube speed measured by the third 208 in order to maintain a constant pitch along tube length.

After the corrugator 210, a second caterpillar 211 pulls the corrugated tube and supplies it to a collecting drum 213.

The metal tube is pulled by the second caterpillar 211 according to a predetermined speed so as to elongate the metal tube and achieve the desired EFL.

The obtained metal tube shortening is measured by comparing the tube length measured by the third encoder 208, provided between the first caterpillar 209 and the corrugator 210, and the tube length measured by a fourth encoder 212, positioned downstream of the corrugator 210 and the second caterpillar 211.

The fourth encoder 212 measures the length value after shortening and elongation, i.e. the final length of the tube in the cable.

In operation, the fourth encoder 212 measures the length passed in the time period when the third encoder 208 measured the passing by of a predetermined length. Preferably, such predetermined length measured by the third encoder 208 is of the order of magnitude of the manufacturing line (e.g. 10 to 50 m).

The resulting excess fiber length is measured by comparing the measurements of the first encoder 202—that measures the length of the optical fibers coming from optical fibers supplier 201—and the fourth encoder 212 that measures the length of tube after the second caterpillar 211.

Finally, the tube with the optical fibers housed therein is wound on a drum 213; the tube is subsequently supplied to further stages, where armoring and sheaths are applied thereto according to the needs. In such stages the EFL value is generally not changed, such that the EFL measured in the line is substantially the same as in the finished cable. However, in case a special treatment made in these stages is expected to modify such value, the parameters of the above described line can be selected to take into account such modification.

In operation, the shortening caused by the corrugator 210 is selected to a value exceeding the one corresponding to the final EFL in the cable.

The caterpillar 211 stretches the corrugated or indented tube by an amount determined to reach, at the encoder 212, the final desired EFL.

In such manner, any uncontrollable variation and tolerance in the shortening obtained by the corrugator is taken into account, thereby achieving the desired precision in the final EFL value.

As an example, if an optical cable with a 0.5% of EFL is desired, a shortening of the metal tube ($S_t$) higher than such value, for example of 0.7%, is settled on. In this way, a metal tube having an original length of 10 m measures 9.993 m after shortening.

If the speed of the second caterpillar 211 is 0.7% lower than speed of the capstan 207, the metal tube maintains the settled percentage of shortening $S_t$. In order to reach the desired EFL of 0.5%, the relative speed of the second caterpillar 211 is set to be 5% lower than that of capstan 207, i.e. an elongation of 0.2% ($S_t$–EFL) is carried out on the tube, so as the final product has a shortening of 0.5%, i.e. a length of 9.995 m.

As the speed of the second caterpillar 211 can be adjusted on the basis of the measured final EFL with a relatively high precision (e.g. within ±0.00025 m/s or ±0.15 m/min), any error on the shortening value $S_t$ can be compensated.

The method of the invention allows to yield a predetermined EFL with a variability along the longitudinal direction of the optical cable much lower than those of the prior art process.

A real time measurement and, in the case, adjustment of the resulting EFL is carried out by controlling the relative speed of the second caterpillar 211 with respect to the capstan 207 speed.

The resulting EFL is calculated according to the formula (1), in which $L_f$ is the optical fiber length measured by the first encoder 202, and $L_t$ is the tube length measured by the fourth encoder 212, both the lengths being measured in the same time span.

In case the resulting EFL is higher than the desired one, i.e. the optical fibers in the tube are "longer" than expected, the relative speed of the second caterpillar 211 with respect the capstan speed 207 is increased by a corresponding amount, in order to provide a higher elongation of the tube and accordingly to reduce the resulting EFL.

In case the resulting EFL is lower the desired one, i.e. the optical fibers are "shorter" then expected, the relative speed of the second caterpillar 211 with respect the capstan speed 207 is decreased by a corresponding amount to provide a lower elongation of the tube and accordingly to increase the resulting EFL.

Figure 3:
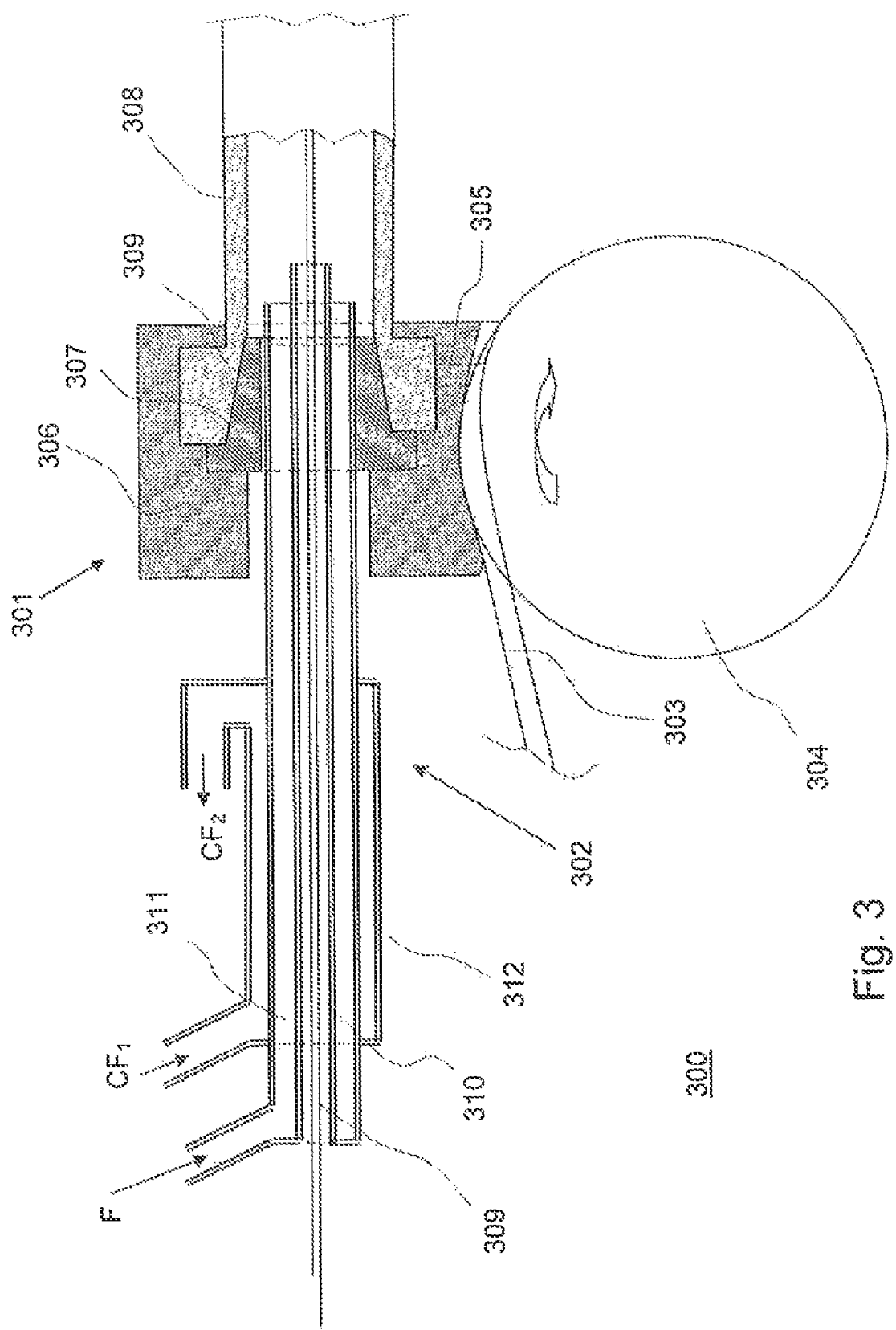
FIG. 3 shows a cross-sectional view of a device for forming a metal tube to the present invention.

FIG. 3 illustrates a portion 300 of an apparatus of the invention, in particular a Conform™ machine 301 and, partially, an injection system 302 for the filler material. A metal rod 303, suitable for producing a tube for the optical cable of the invention is conveyed from a rotating frictional wheel 304 by an opening 305 into a chamber 306. The increase in temperature at the surface of the frictional wheel 305 and the pressure produced by the continuously conveyed material causes the metal rod 303 to become plastic. The plasticized metal 309 is then forced through an exit opening of a nozzle 307 to form the metal tube 308.

One optical fiber 309 (or a bundle of optical fibers) is conveyed through a first feed channel 310 terminating downstream from the nozzle 307. A filler material (arrow F) is conveyed through a second feed channel 311 provided in a radially external position with respect to the first feed channel 310, and terminating downstream from the nozzle 307. A refrigerating circuit 312 for a cooling fluid is provided coaxially and in radially external position with respect to the first and second feed channels 310, 311. Input and output of the refrigerating fluid are shown by the arrows $CF_1$, $CF_2$.

Figure 4:
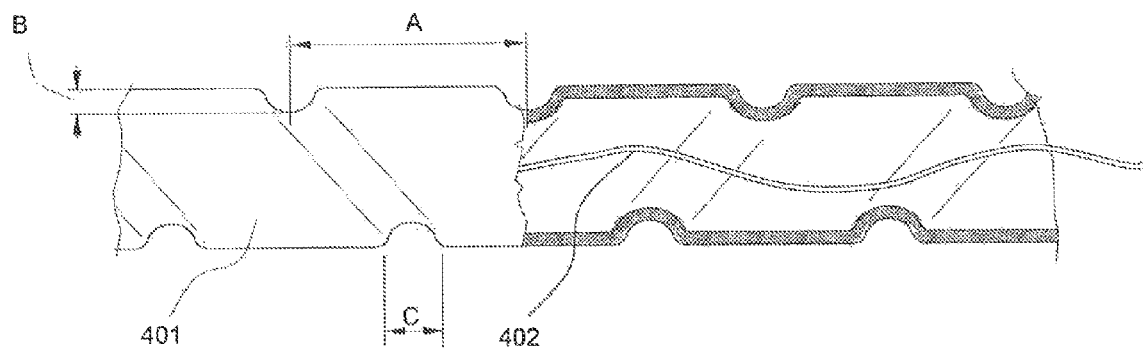
FIG. 4 shows a metal tube in partial longitudinal section housing an optical fiber.

In FIG. 4, a metal tube 401 housing one optical fiber 402 is shown partially cross-sectioned in an axial plane, to show an exemplary indentation profile.

The metal tube 401 is helically indented with a pitch A and a depth B (from the outer, non indented surface of the tube).

The width C of the indentation (determined by the indentation tool) is preferably relatively small with respect to the pitch A. for example, the width C may vary between 10 and 50% of the pitch A, and, preferably between 20 and 30% of the pitch A.

Preferably, the indentation depth B is between 2% and 15% of the width C.

Preferably the indentation depth B is such as not to reduce the inner diameter of the tube to more than 10% of the original, non-indented inner tube diameter.

While a preferred indentation is an helical indentation, in particular for manufacturing reasons, other types of indentation may be used to the purposes of the present invention, for example annular indentations at regular or non-regular distance along the tube.

Example 1

Comparative

An aluminium tube having outer diameter of 4.6 mm and wall thickness of 1.7 mm was produced, housing 6 optical fibers.

The tube was produced with a Conform™ machine, and was shortened by corrugation.

A constant pulling force of 40 kgf was applied downstream from the corrugator by a caterpillar.

A length of 10 km of optical fiber housing tube was produced.

The desired EFL was of 0.7%.

The resulting metal tube provided an average EFL of 0%, that means that the shortening due to the corrugation was completely cancelled by the subsequent drawing.

Frequent breaks were also observed during the production.

Example 2

Comparative

An aluminium tube having outer diameter of 4.95 mm and a wall thickness of 1.25 mm was produced, housing 6 optical fibers.

The tube was produced with a Conform™ machine.

The 6 optical fibers were supplied into the tube while it was formed together with a gel Seppigel®H-LAV (Seppigel® is a registered trademark of Seppic).

The tube was cooled by water spraying.

After cooling, the tube was shortened of 0.9% by corrugation. The corrugation was applied with the following parameters:
pitch: 10 mm;
width: 3 mm; and
depth: 0.25 mm.

The shortened tube was then elongated of 0.2% by applying a pulling force of 20 kgf downstream from the corrugator.

Said pulling force was applied by a motor-driven caterpillar, which operation was controlled to maintain the pulling force substantially constant (±10%)

A length of 6 km of optical fiber housing tube was produced.

The desired EFL was of 0.7%.

Figure 5:
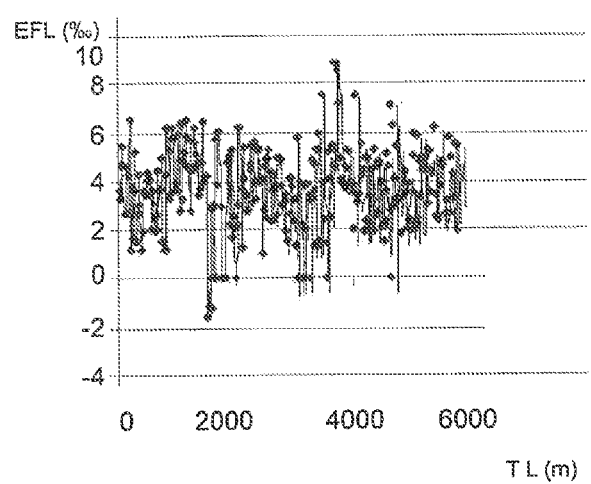
FIG. 5 relates to the EFL variation in a cable manufactured according to the prior art.

The resulting EFL was found varying from −0.22% to +0.9% as shown in FIG. 5.

Example 3

Invention

An aluminium tube having an outer diameter of 5.6 mm and a wall thickness of 1.8 mm was produced, housing 24 optical fibers.

The fibers were provided together with a gel Seppigel®H-LAV

The tube was cooled by water spraying.

After cooling, the tube was shortened of 0.9% by corrugation.

The corrugation was applied with the following parameters:
pitch: 11 mm;
width: 3.5 mm; and
depth: 0:3 mm.

The shortened tube was then elongated of 0.2% by applying a pulling force downstream from the corrugator.

Said pulling force was applied by a motor-driven caterpillar. The operation of said caterpillar was controlled to vary the pulling speed as a function of the EFL resulting from the measurements of the tube length measured by the forth encoder downstream from the elongation and of the fiber length measured by the first encoder, said lengths being passed in the same period of time (e.g. 40 m/min).

A length of 2.6 km of optical fiber housing tube was produced.

The desired EFL was of 0.7%.

Figure 6:
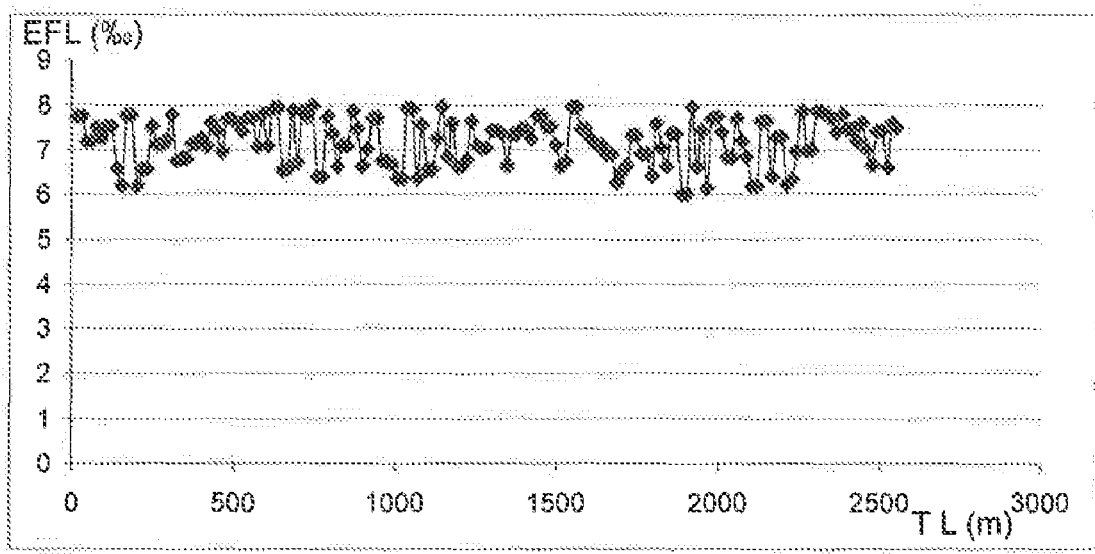
FIGS. 6 and 7 relate to the EFL variation in a cable manufactured according to the invention.
Figure 7:
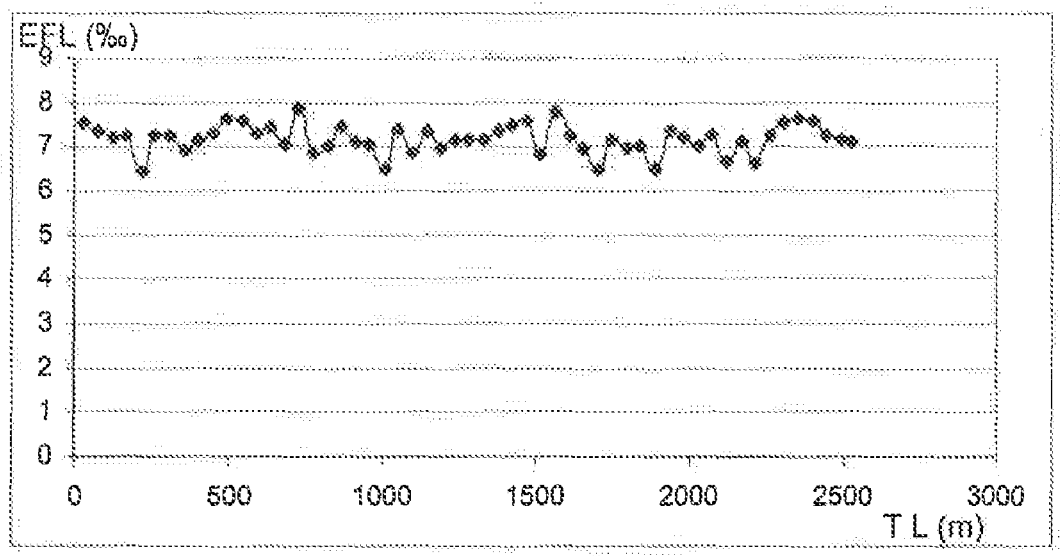

The resulting EEL was found varying from 0.8% to 0.6%, as shown in FIGS. 6 and 7 reporting the EFL % in abscissa and the produced tube length (m) in ordinate. In particular, FIG. 6 shows the EFL variation by measurements effected every 15 m, and FIG. 7 shows the EFL variation by measurements effected every 45 m.

As evidenced by the above Example 1 the lack of control of the pulling force after the corrugation of the metal tube has been found to cause the tube shortening resulting from the tube corrugation to be practically removed in the subsequent operations, thereby preventing a significant EFL from being obtained.

In Example 2 a substantially constant pulling force after the corrugation of the metal tube was applied.

The control of the pulling force proved to be effective to maintain a certain amount of the applied tube shortening, so that the obtained tube had an average value of EFL closed to the desired value. However, it has been observed that it was not possible to maintain a constant value of local EFL throughout the production; in view of oscillations of the corrugation conditions difficult to be avoided, and of the uneven tube behavior in the corrugating machine, so that the local EFL varied beyond acceptable limits with respect to the average EFL along the longitudinal extension of the cable.

In Example 3 the elongation was controlled by controlling the speed of the caterpillar downstream from the corrugator. The speed control has been found effective to maintain the desired geometrical conditions (i.e. the EFL) within narrow tolerance limits, in spite of any possible unevenness of the behavior of the tube in the corrugating machine and in the elongating caterpillar.

The invention claimed is:

1. Optical cable comprising at least one metal tube housing at least one optical fiber, said cable having a local excess fiber length (EFL) varying of or less than 0.2% along the longitudinal extension of the cable with respect to an average EFL of the cable wherein the metal tube has been shortened and then elongated by means of an apparatus for manufacturing the optical cable, said cable having a predetermined excess fiber length (EFL), the apparatus comprising
a device for continuously forming a metal tube;
a first feed channel for conveying at least one optical fiber into said metal tube;
a first pulling device for making the metal tube and the at least one optical fiber congruent;
a corrugator for shortening said metal tube;
a second pulling device downstream of the corrugator for elongating said metal tube.

2. Optical cable according to claim 1 which is selected from an optical ground wire, an optical phase conductors and a terrestrial cable for use in harsh environment.

3. Optical cable according to claim 1 wherein the cable has an average EFL of from 0.2% to 1.5%.

4. Optical cable according to claim 3 wherein the cable has an average EFL of from 0.2% to 0.9%.

5. Optical cable according to claim 1 wherein the average EFL has a negative value.

6. Optical cable according to claim 1 wherein the local EFL varies of or less than 0.1% along the longitudinal extension of the optical cable.

7. Optical cable according to claim 1 wherein the optical cable of the invention comprises at least one metal tube housing from 12 to 96 optical fibers.

8. Optical cable according to claim 7 wherein the optical cable of the invention comprises at least one metal tube housing from 24 to 48 optical fibers.

9. Optical cable according to claim 1 wherein the at least one metal tube is made from a plastically deformable metal material.

10. Optical cable according to claim 9 wherein the metal material is selected from steel, aluminium, aluminium alloys and copper.

11. Optical cable according to claim 1 wherein the at least one metal tube is longitudinally shortened with respect to the at least one optical fiber housed therein by creasing, indentation or corrugation.

12. Optical cable according to claim 11 wherein the metal tube is shortened by indentation.

13. Optical cable according to claim 11 wherein creasing, indentation or corrugation has a depth from 0.05 mm to 2 mm from the outer enveloping surface of the tube.

14. Optical cable according to claim 13 wherein the depth is of from 0.1 mm to 1 mm from the outer enveloping surface of the tube.

15. Optical cable according to claim 11 wherein creasing, indentation or corrugation is an helix with a pitch of from 5 mm to 15 mm.

16. Optical cable according to claim 1 wherein the metal tube has an internal diameter of from 2 to 11 mm.

17. Optical cable according to claim 16 wherein the metal tube has an internal diameter of from 2 mm to 4 mm.

18. Optical cable according to claim 1 wherein the metal tube has an external, diameter of from 3 to 15 mm.

19. Optical cable according to claim 18 wherein the metal tube has an external diameter of from 3 mm to 6 mm.

20. Optical cable according to claim 1 wherein the at least one optical fiber housed in the metal tube is embedded in a filler material.

21. Optical cable according to claim 20 wherein the filler material is a selected from a gel, a jelly or a grease.

22. Optical cable according to claim 20 wherein said filler material shows at least one characteristic selected from hydrophobicity, hydrogen absorption, thixotropy.

23. Optical cable according to claim 22 wherein the filler material shows an hydrogen absorption equal to or higher than 0.1 cm$^3$ STP/g, more preferably equal to or higher than 0.5 cm$^3$ STP/g.

24. Optical cable according to claim 20 wherein the filler material shows a viscosity of from 40 to 300 Pas.

25. Optical cable according to claim 24 wherein the filler material shows a viscosity of more preferably from 50 to 120 Pa·s.

26. Apparatus for manufacturing an optical cable comprising at least one metal tube housing at least one optical fiber, said cable having a predetermined excess fiber length (EFL), the apparatus comprising
a device for continuously forming a metal tube;
a first feed channel for conveying at least one optical fiber into said metal tube;
a first pulling device for making the metal tube and the at least one optical fiber congruent;
a corrugator for shortening said metal tube;
a second pulling device downstream of the corrugator for elongating said metal tube.

27. Apparatus according to claim 26 wherein the device for forming the metal tube is a continuous metal conforming machine.

28. Apparatus according to claim 26 comprising a second feed channel for conveying a filler material into said metal tube.

29. Apparatus according to claim 28 wherein the second feed channel is coaxial and in a radially external position with respect to the first feed channel.

30. Apparatus according to claim 26 comprising a first cooling device surrounding said first feed channel.

31. Apparatus according to claim 30 wherein said first cooling device comprises a cooling tube, coaxial and in a radially external position with respect to the first feed channel.

32. Apparatus according to claim 31 wherein said cooling tube is coaxial and radially external to the second feed channel.

33. Apparatus according to claim 26 wherein a second cooling device is provided downstream from the device for forming the metal tube.

34. Apparatus according to claim 26 wherein, upstream from the first pulling device, a die is provided.

35. Apparatus according to claim 26 wherein the first pulling device is selected from a capstan or a caterpillar.

36. Apparatus according to claim 35 wherein the first pulling device is a capstan.

37. Apparatus according to claim 26 wherein the corrugator provides shortening with an angle of from 0.1° to 15°.

38. Apparatus according to claim 37 wherein the corrugator provides shortening with an angle of from 0.5° to 8°.

39. Apparatus according to claim 26 wherein the second pulling device is selected from a caterpillar or a capstan.

40. Apparatus according to claim 39 wherein the second pulling device is a capstan.

41. Apparatus according to claim 26 comprising at least one length measuring device.

42. Apparatus according to claim 26 comprising four length measuring devices.

43. Apparatus according to claim 41 wherein the at least one length measuring device is located downstream of the second pulling device and measures a final length of the metal tube in the cable.

44. Apparatus according to claim 26 further comprising at least one length measuring device selected from an encoder and laser-based contactless instruments using a Doppler effect.

45. Apparatus according to claim 26 further comprising
a length measuring device located upstream of the first feed channel which measures length of optical fibers advanced in a given period of time; and
another length measuring device located downstream of the second pulling device for measuring a final length of the metal tube in the cable.

46. Apparatus according to claim 33 further comprising
a length measuring device located downstream of the second cooling device which measures length of the metal tube advanced in a given period of time; and
another length measuring device located downstream of the first pulling device which measures length of the metal tube advanced in a given period of time.

47. Apparatus according to claim 45 wherein resulting excess fiber length is measured by comparing the length of optical fibers and the length of the metal tube measured by the length measuring devices.

48. Apparatus according to claim 47 configured to adjust the resulting excess fiber length by controlling the elongation of the metal tube in the second pulling device to reach said predetermined excess fiber length (EFL).

* * * * *